INVENTOR.
George L. Herzog
BY
Herman E. Smith
ATTORNEY

June 29, 1965 G. L. HERZOG 3,191,760
OVERHEAD SUPPORT FOR CONVEYOR FRAME
Filed Aug. 20, 1963 2 Sheets-Sheet 2

INVENTOR.
George L. Herzog
BY
Herman E. Smith
ATTORNEY

United States Patent Office 3,191,760
Patented June 29, 1965

3,191,760
OVERHEAD SUPPORT FOR CONVEYOR FRAME
George L. Herzog, Chicago, Ill., assignor to Goodman Manufacturing Company, Chicago, Ill., a corporation of Illinois
Filed Aug. 20, 1963, Ser. No. 303,335
4 Claims. (Cl. 198—192)

This invention relates generally to conveyors and more particularly to overhead supporting structure therefor.

In belt conveyor installations it is desirable that the supporting structures be transversely leveled and longitudinally aligned with each other. Where the conveyor is supported on the ground, these requirements can usually be met by blocking up the supporting structure. Where the conveyor is suspended from above, as in a mine or tunnel, it is often impossible to locate the points of attachment exactly where they should be for transverse and longitudinal alignment with each other in a horizontal plane.

Accordingly, it is an object of the present invention to provide conveyor supporting structure, having horizontally and vertically adjustable connectors, for suspension from an uneven roof.

Other objects and advantages of the invention will become apparent from the following description together with the drawings.

Figure 1:
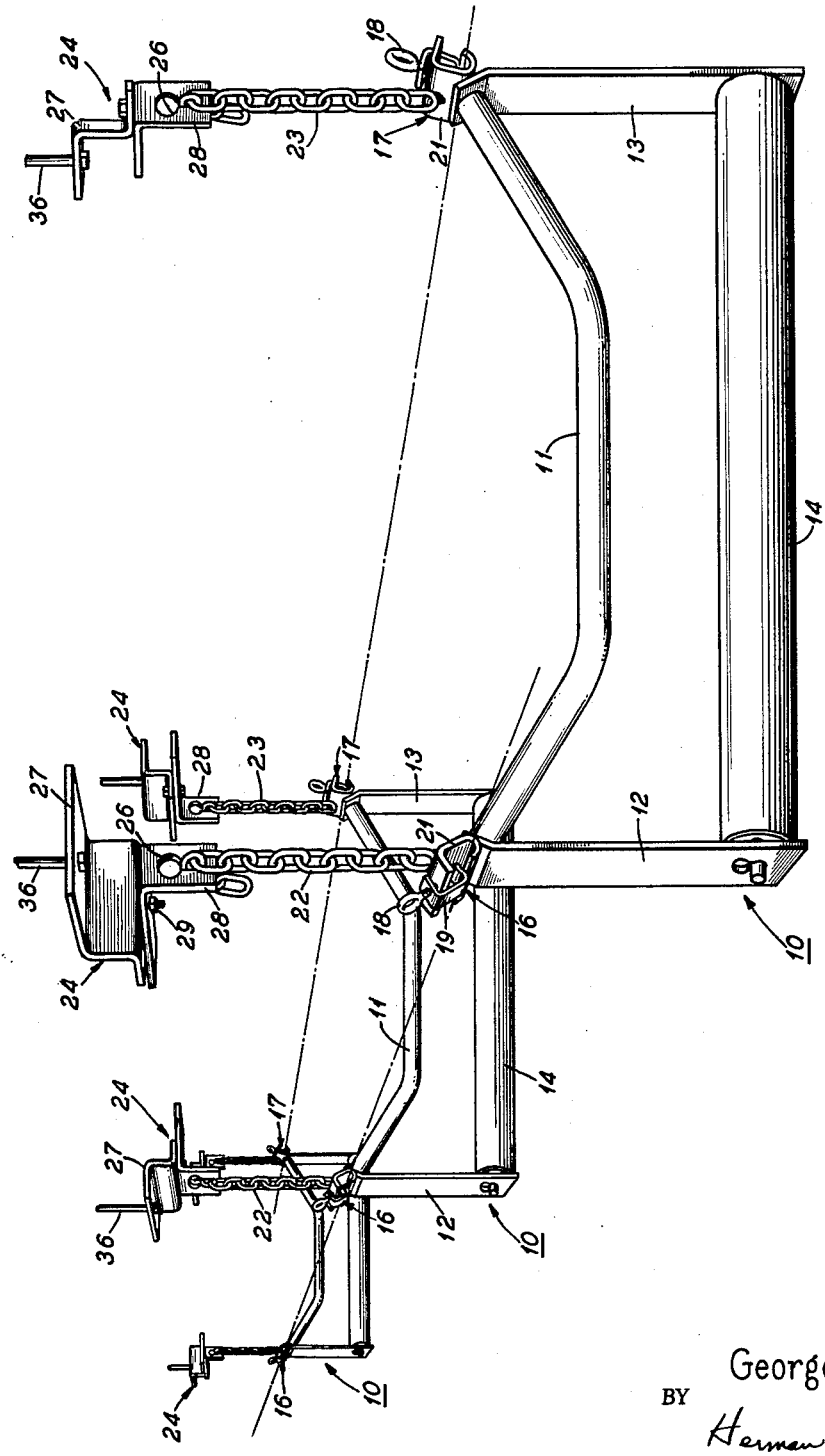
FIGURE 1 is a perspective view of several aligned conveyor components according to the present invention.
Figure 2:
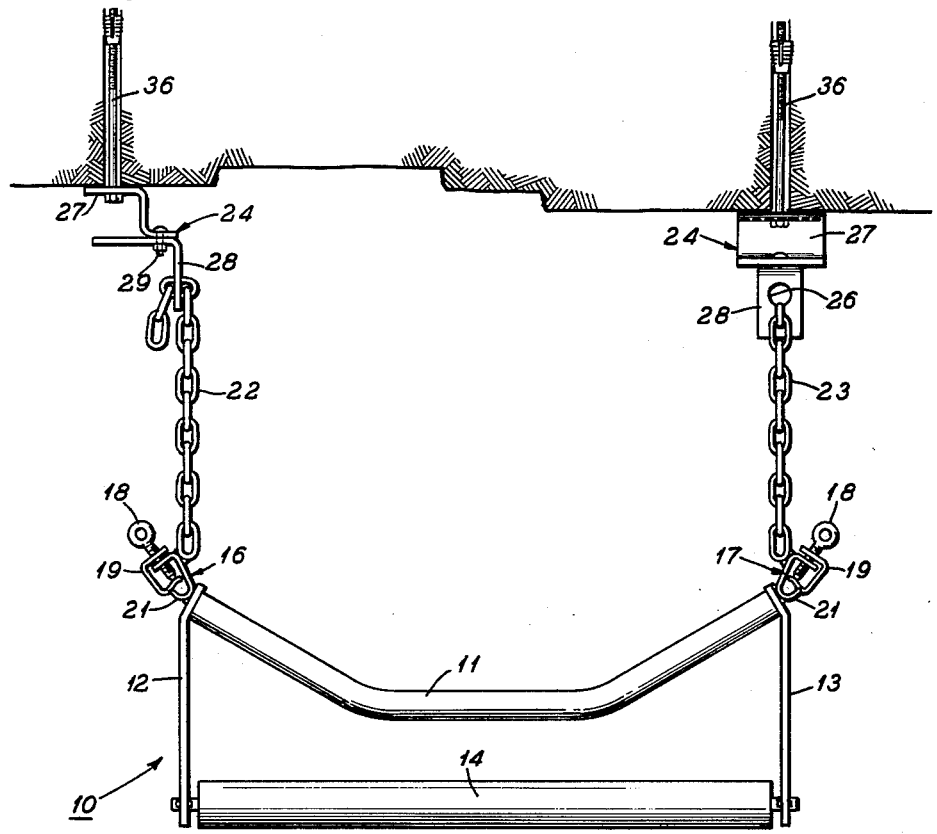
FIGURE 2 is an elevation view of a conveyor component, according to the present invention, showing horizontal and vertical adjustability of the connectors.
Figure 3:
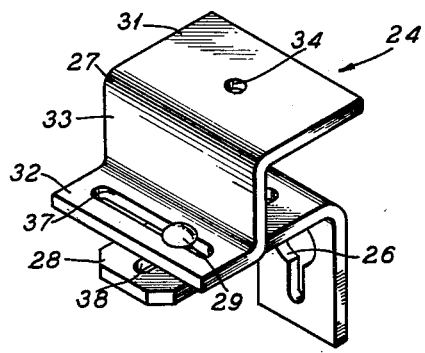
FIGURE 3 is a perspective view of the attachment assembly capable of longitudinal, transverse and angular adjustability.

Referring now more particularly to the drawings, the numeral 10 refers generally to a transverse frame member for a belt conveyor. A cross bar 11 transversely spaces side straps 12 and 13 which carry a belt supporting return roller 14. Clamps 16 and 17 are located at respective ends of cross bar 11. Each clamp has a bight portion 21 adapted to receive a longitudinal frame member such as the rope of a rope sideframe conveyor. Other portions of the conveyor structure such as troughing rollers may be mounted on such longitudinal frame members. Each clamp has an eye screw 18 and vise jaw 19 for securing the longitudinal member in the bight 21. Extending upwardly from clamps 16 and 17 are chains 22 and 23 providing adjustable length supporting members. Each chain is connected through securement means, here shown as a keyhole slot 26, in a respective one of attachment devices 24. As shown in FIG. 2, different links of the chain can be secured in keyhole slot 26 to provide for transverse levelling where the roof is uneven.

Attachment device 24 has a Z bar 27 and a slide bar 28 connected to each other by a connecting assembly, here shown as a carriage bolt 29. Z bar 27 has an upper plate 31 and a lower plate 32 joined by a web 33. Upper plate 31 has an aperture 34 through which a roof bolt 36 can be inserted to secure Z bar 27 to a mine roof or other overhead structure, the bolt and aperture forming in effect a connecting assembly. Lower plate 32 has an elongated slot 37 extending parallel to web 33 through which carriage bolt 29 extends.

Slide bar 28 has a second elongated slot 38 which extends along the length thereof toward keyhole slot 26. Carriage bolt 29 also extends through slot 38 to provide a connecting joint between Z bar 27 and slide bar 28 which permits longitudinal and transverse sliding adjustment plus angular adjustment. With the slide bar extended so that keyhole slot 26 is maximum distance from hole 34, the Z bar and slide bar can be rotated together about hole 34 so that keyhole slot 26, which functions as a securement point for the chains, sweeps out a circle. Then by moving slide bar 28 through combinations of longitudinal, transverse and angular motion, the keyhole slot in slide bar 28 can be spotted at any position within the perimeter of the above-defined circle.

Of importance is the fact that the keyhole slot in slide bar 28 can be positioned at any location within the perimeter of the above-mentioned circle including a location in exact alignment with roof bolt 36. Although such alignment will not take place in every instance, it is advantageous to have such an alignment available if conditions will permit.

Where the condition of the roof or other overhead structure makes it impractical to make connections to the roof at the precise location required for proper conveyor alignment, the apparatus of the present invention permits the first point of connection, to the roof, to be made in accordance with the condition of the roof and the second point of connection, to the conveyor, to be moved into alignment with the conveyor.

While I have shown and described a preferred embodiment of my invention, it is to be understood that other forms may be practiced within the spirit of the invention and the scope of the following claims.

I claim:

1. Apparatus for supporting a conveyor belt in co-planar and linear alignment with a conveyor course from overhead structure, comprising:
    a belt supporting roller rotatable about a shaft extending through said roller along its axis of rotation;
    a pair of adjustable length supporting members each connected to a respective end of said roller shaft; and
    an attachment device for each supporting member, each attachment device having an upper and a lower bar connected to each other by a pivotable and slideable joint, said upper bar having a first connecting point laterally spaced from said joint adapted for pivotal attachment to said overhead structure, said lower bar having a second connecting point laterally spaced from said joint and vertically spaced from said first connecting point adapted for attachment to one of said supporting members, whereby said second connecting point is adjustable to any position within the perimeter of a circle circumscribed about the first connecting point including a position in vertical alignment with said first connecting point.

2. The structure according to claim 1 in which said attachment device is comprised of a pivotably and slidably interconnected Z bar and slide bar,
    said Z bar having a pair of offset plates spaced apart by a web, one of said plates including a first elongated aperture extending parallel to said web and the other of said plates including said first connecting point,
    said slide bar including a second elongated aperture and said second connecting point.

3. Apparatus for supporting a belt conveyor in preselected linear and co-planar alignment from overhead structure, comprising:
    an elongated rigid spreader having clamps at its opposite ends for supporting conveyor frame members;
    a return roller depending from said clamps;
    a pair of adjustable length supporting members extending upwardly from said clamps; and
    a pair of attachment devices, each having an upper and a lower bar connected to each other by a pivotable and slideable joint, said upper bar having a first connecting point laterally spaced from said joint adapted for pivotal attachment to said overhead structure, said lower bar having a second connecting point laterally spaced from said joint and vertically spaced from said first connecting point adapted for attachment to one of said supporting members, whereby said second connecting point is adjustable to any position within the perimeter of a circle circumscribed about an upwardly extending axis through said first connecting point including a position in alignment with said axis.

4. Apparatus for supporting a belt conveyor from an elevated location and for permitting alignment of the supporting apparatus laterally and longitudinally at a number of different locations relative to the point of connection to the elevated location, including a point in vertical alignment with the connection to the elevated location comprising:

an attachment device, said attachment device having an upper and a lower member connected to each other by a connecting assembly which enables said members to be longitudinally and laterally slidable with respect to one another, said upper member having connecting means vertically spaced from said connecting assembly which pivotally connects the upper member to the elevated location at a connecting point, said lower member having securement means horizontally spaced from said connecting assembly and vertically spaced from said pivotal connecting point which provides a securement point for a conveyor component to be supported, whereby said securement point may be adjusted to any position within the perimeter of a circle defined about the connecting point by the maximum displacement of the securement point from the connecting point, including a position in vertical alignment with said connecting point.

References Cited by the Examiner
UNITED STATES PATENTS

| | | | |
|---|---|---|---|
| 2,400,224 | 5/46 | Christensen | 248—16 |
| 3,049,220 | 8/62 | Lo Presti | 198—192 |
| 3,062,360 | 11/62 | Arndt | 198—184 |
| 3,066,898 | 12/62 | Haynes | 248—23 |
| 3,075,631 | 1/63 | Arndt | 198—192 |

FOREIGN PATENTS 461,751   6/28   Germany.

SAMUEL F. COLEMAN, *Primary Examiner.*

ERNEST A. FALLER, *Examiner.*